Patented Aug. 24, 1948

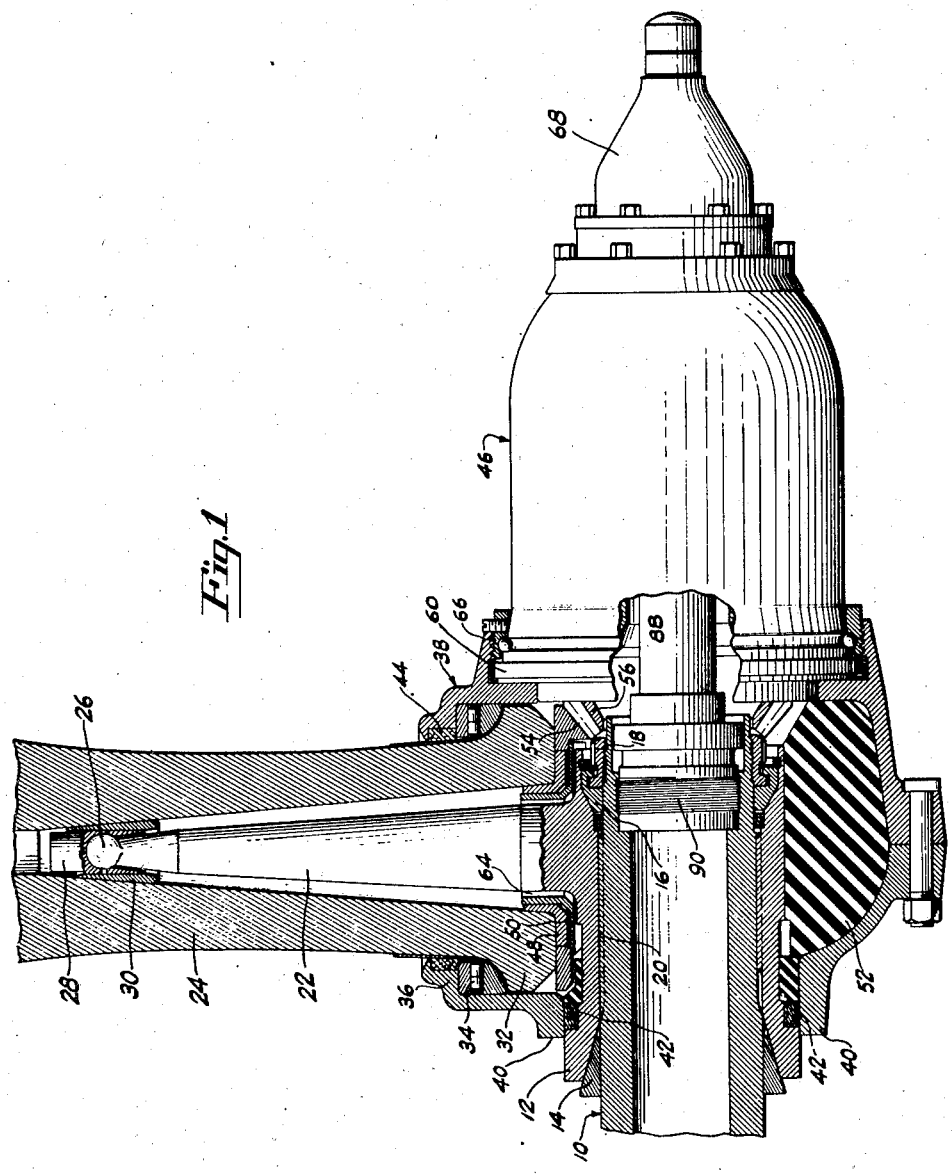

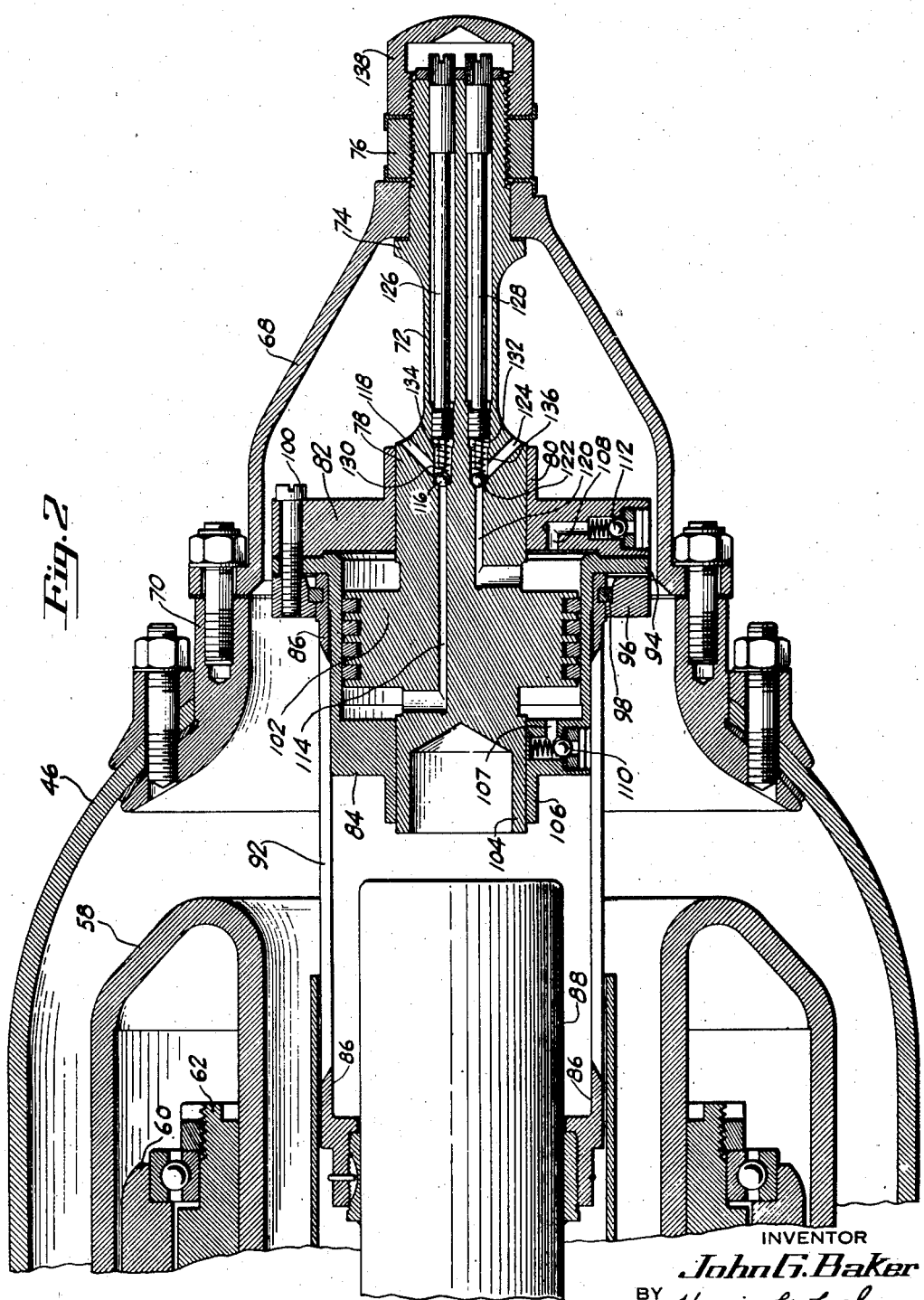

2,447,628

UNITED STATES PATENT OFFICE 2,447,628

PROPELLER VIBRATION DAMPING MEANS

John G. Baker, Evansville, Wis., assignor to United Aircraft Corporation, East Hartford, Conn., a corporation of Delaware Application June 6, 1942, Serial No. 446,041

10 Claims. (Cl. 170—162)

This invention relates to improvements in aeronautical propellers with particular reference to vibration controlling means, as disclosed in United States Patent No. 2,144,428 issued January 17, 1939, to Erle Martin for Aeronautical propeller having vibration controlling features.

A further object resides in the provision of an improved aeronautical propeller of the character indicated having flexible connections between the blades and the shaft-mounted portion of the propeller hub, giving the blades a limited freedom of resiliently resisted movement relative to the shaft-mounted hub portion, and means for frictionally damping the relative movements between the blades and the hub.

A still further object resides in the provision of an improved aeronautical propeller of the character indicated in which the shank ends of the blades are given a limited freedom of resiliently resisted movement relative to the propeller shaft, and in which means is provided for frictionally damping the component of the blade movement in the direction of the axis of the propeller shaft.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention as it will be apparent to those skilled in the art that various changes in the illustrated embodiment may be resorted to without in any way exceeding the scope of the invention.

In the drawings, Fig. 1 is a longitudinal view, partly sectional, of an aeronautical propeller constructed according to the invention, and Fig. 2 is a longitudinal sectional view on an enlarged scale of the hydraulic mechanism for frictionally damping the vibrational movements of the propeller blades.

The present invention permits limited freedom of resiliently-resisted movements between the propeller blades and the propeller drive shaft and means for frictionally damping such blade movements to thereby absorb the vibrational energy and reduce both the amplitude of vibrational movements and the intensity of the vibrational forces.

Referring to the accompanying drawings and particularly to Fig. 1, the numeral 10 indicates a propeller drive shaft of an engine, not illustrated.

A hub spider 12 is mounted on shaft 10 by suitable means such as a rear cone 14, a front cone 16, a front cone nut 18, and splines 20 between shaft 10 and spider 12. The spider is provided with a plurality of elongated flexible arms 22, one for each blade 24. Each arm 22 extends through the hollow shank end of the blade and is provided at its outer end with a spherical knob 26 upon which is mounted a split crosshead 28 slidable in a tubular guide 30 secured in the blade.

The shank of blade 24 is provided with an outwardly extending flange 32 upon which is seated an anti-friction thrust bearing 34 which bears against a flange 36 formed on a split barrel member 38 surrounding the blade shank. This type of blade retention means is well known to the art and has been shown for convenience in the illustration of the invention but it is to be understood that the invention is in no way limited to the particular type of blade retention means so illustrated and described.

The hub barrel 38 is axially slidable on spider 12 and is provided at its rearward end with a flange 40 cooperating with a packing ring 42 to provide a fluid seal between the barrel member and the spider. Suitable packing rings, one of which is indicated at 44, are also provided in the hub barrel around the shank of each blade. The front end of the hub barrel is closed by a dome 46 to make the hub a tight receptacle within which fluid may be retained for lubricating the various working parts of the propeller pitch changing mechanism and for use in the damping device. A seat for the inner end of the blade is provided by bearing members 48 and 50 which have portions extending within the cavity in the blade shank and portions overlying the inner end surface of the blade and bearing on suitable blade supports such as the somewhat resilient non-metallic blocks, one of which is indicated at 52, included within the hub barrel 38 between the blades.

The blades are rotated in pitch changing directions by suitable means well known to the art and including gear sectors, one of which is indicated at 54, secured to the inner ends of the blades and meshing with a master gear 56 rotatable about the axis of the shaft 10 by suitable mechanism which may include the piston 58 and the cylindrical cam members 60 and 62, particularly illustrated in Fig. 2.

For a detailed illustration and description of a suitable pitch changing mechanism reference may be had to United States Patent No. 2,174,717, issued October 3, 1939, to Frank W. Caldwell et al., for Multiposition controllable pitch propeller, or to Patent No. 2,280,713, issued April 21, 1942, to Martin et al., for Feathering propeller.

It is to be particularly noted in Fig. 1 that the portion of the blade supporting member 50 which extends within the hollow blade shank is annularly spaced from the included portion of the spider arm 22, as indicated at 64. Since the arm 22 is flexible and the barrel 38 is axially slidable and rotatable relative to the hub spider 12, it is apparent that the hub-included end of the blade may move relative to the hub spider both axially and rotationally by an amount limited by the space 64.

The shank end of the blades may move bodily under the excitation of vibrational forces against the resistance of the resilient arms 22. This provides a vibration-induced movement of the blades at a place where a damping device can be connected. The arrangement permits a substantial absorption of vibration energy by providing a vibration-induced movement of the propeller blade shanks and the associated hub barrel and then converting a substantial portion of the energy of this movement into fluid friction by means of a suitable damping (pumping) device secured to the hub barrel, which is, in turn, closely associated with the shank ends of the propeller blades.

The damping mechanism is particularly illustrated in Fig. 2 in which the dome 46, secured to the hub barrel by the threaded connection 66 (Fig. 1), transmits vibration induced movements of the hub barrel through dome extension 68 and annular connector 70 to a piston rod 72 secured at one end to the dome extension 68 by means of shoulder 74 and clamp nut 76. While the drawings show a dome having a separate extension and an annular connector, it is to be understood that a one piece dome member extending from the hub barrel to the piston rod 72 may be utilized if desired.

Intermediate its length the piston rod 72 is somewhat enlarged to provide a bearing portion 78 slidably mounted in a bearing 80 carried by a cylinder head 82 which closes the open end of a cylinder 84 within the open, forward, end of tube 86. The tube is secured at its opposite or rearward end to a tubular member 88 which is in turn rigidly secured to the forward end of the propeller shaft 10 by suitable means such as threads 90 in Fig. 1. Thus cylinder 84 and cylinder head 82 are held against axial movement relative to the propeller shaft 10 and the hub spider 12. Longitudinal slots 92 lengthwise of tube 86 make this tube sufficiently flexible to accommodate any slight misalignment between tube 86 and dome extension 68. Cylinder 84 is provided at its forward end with an outwardly extending flange 94 between cylinder head 82 and a ring 96 secured to the end of the tube 86 by a snap ring 98. Screws 100 threaded into ring 96 and passing through the cylinder head and flange 94 serve to clamp these members together and rigidly secure the cylinder and cylinder head to the outer end of tube 86.

Within cylinder 84 piston rod 72 carries a piston 102. The end of the piston rod to the left of the piston is provided with a bearing portion 104 slidable in a bearing 106 integral with cylinder 84 so that the areas of the working surfaces on both sides of the piston 102 are substantially equal.

Since cylinder 84 is rigidly connected by tubes 86 and 88 to the propeller shaft and the hub spider 12, and since piston rod 72 is rigidly connected through dome 46 to hub barrel 38 and the shank ends of the propeller blades, the above mentioned axially slidable and rotatable movements, in clearance 64, of the blade shank ends relative to the hub spider by reason of the resiliency of spider arm 22, will cause piston 102 to reciprocate axially and rotate in cylinder 84. The piston 102 and cylinder 84 are relatively freely rotatable but axial reciprocation is resisted by the following mechanism. The cylinder has two fluid inlet ports, as indicated at 107 and 108, located one at each end of the cylinder. The ports are controlled by check valves 110 and 112 respectively. With this arrangement, when the piston moves to the right as viewed in Fig. 2 fluid will be drawn into the left end of the cylinder through the port 107 and check valve 110, and when the piston moves to the left fluid will be drawn into the right hand end of the cylinder through port 108 and check valve 112. This fluid such as oil is drawn from the lubricating fluid supply contained in the propeller hub including the dome 46. As the propeller rotates the fluid is forced outwardly by centrifugal force, tending to leave a core of air along the rotational axis of the propeller hub. The inlets to valves 110 and 112, however, are located at radial distances from the axis of rotation of the hub sufficient to maintain these inlets at all times in the body of fluid contained in the dome so that air will not ordinarily be drawn into cylinder 84. As the check valves prevent the return flow of fluid from the cylinder through the ports 107 and 108 to the interior of the dome other means must be provided to vent the trapped fluid in order to permit axial movement of the piston 102 in the cylinder. A channel 114 leads from the space between the piston and the left end of the cylinder, through the piston rod to a control valve 116, and a vent 118 leads from this valve to the exterior of the piston rod within dome extension 68. A similar channel 120 leads from the right hand end of the cylinder to a control valve 122, and a vent 124 leads from valve 122 to the exterior of the piston rod 72 within the dome extension 68. Thus, when piston 102 moves to the left as viewed in Fig. 2, while fluid is being drawn into the space between the piston and the cylinder head 82 through port 108 and check valve 112, at the same time fluid will be expelled from the other end of the cylinder through channel 114, control valve 116 and vent 118. Similarly, when the piston moves to the right fluid from the space between the piston and the cylinder head will be expelled through the channel 120, control valve 122 and vent 124. The outlets of vents 118 and 124 are relatively close to the axis of rotation of the propeller and may come within the core of air which may surround this axis, but, since the control valves 116 and 122 act as check valves to prevent any fluid entering the cylinder through the channels 114 and 120, no air will be drawn into the cylinder from that source. This arrangement of valves renders the piston and cylinder mechanism in effect a pump which under the actuation of vibration-induced movements of the shank ends of the propeller blades withdraws fluid from the interior of the dome through check valves 110 and 112 and returns it to the dome through control valves 116 and 122. This circulation of fluid prevents any undue increase in the temperature of the fluid used for damping the movements of the piston 102, and also tends to eliminate from the cylinder any air that may be brought into the cylinder entrained with liquid contained in the propeller hub.

The damping effect of the piston and cylinder device may be regulated by adjusting control valves 116 and 122. This adjustment may be accomplished by the screws 126 and 128 which bear against compression springs 130 and 132 which, in turn, bear on the ball members of the control valves. Extensions 134 and 136 on screws 126 and 128 serve to limit the maximum opening of the control valves. For convenience in adjustment, screws 126 and 128 are extended outwardly to the end of the piston rod 72 where they are provided with suitable tool slots and covered with a screw cap 138. While adjustable control valves have been illustrated and hereinabove described it is to be understood that the invention is not necessarily limited to such an arrangement since it is conceived that once the characteristics of a particular propeller organization were known, fixed valves of the proper restriction could be provided which would function satisfactorily for all propellers of that particular size and type.

From the above description it will be apparent that the fluid damper has substantially no tendency to rebound or spring back, but opposes or resists such return movement and is held by fluid friction in any position in which it may come to rest and is, therefore, a nonresilient or inelastic damper as distinct from a resilient damper such as a resilient rubber layer which will store part of the vibration energy as potential energy and may utilize that potential energy to return to its original position upon release of the stress which caused the original movement.

While a suitable mechanical embodiment for the purpose of disclosing the invention has been hereinabove described and illustrated in the accompanying drawings, it is to be understood that the invention is not limited to the particular embodiment so illustrated and described, but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In a propeller having a hub including a portion fixed against axial movement relative to a propeller shaft, and a plurality of blades carried by said hub, fluid actuated propeller pitch changing means including a fluid chamber, a flexible connection between each blade and said hub portion including means resiliently resisting movement of the hub ends of said blades relative to said hub portion, and a fluid pump having one relatively movable part connected with said hub portion and another relatively movable part connected with the hub ends of said blades and having a valve-controlled fluid outlet and inlet connected with said chamber whereby fluid will be taken from said chamber, forced through the pump and returned to said chamber by movements of the hub ends of said blades relative to said hub portion, said pump having a restricted fluid outlet passage for producing fluid friction to damp the movements of the hub ends of said blades relative to said hub portion.

2. In a propeller having a hub including a portion fixed against axial movement relative to a propeller shaft, and a plurality of blades carried by said hub, a flexible connection between each blade and said hub portion providing a limited freedom of resiliently-resisted movement of the hub ends of said blades relative to said hub portion, and a fluid pump having one relatively movable part connected with said hub portion and another relatively movable part connected with the hub ends of said blades and having a valve-controlled fluid outlet whereby fluid will be forced through said pump by movements of the hub ends of said blades relative to said hub portion, said pump having a restricted fluid outlet passage for applying fluid friction to damp the movements of the hub ends of said blades relative to said hub portion, said propeller hub constituting a fluid reservoir and said fluid pump being disposed in said hub substantially concentric therewith with fluid inlet passages having their intake ends radially spaced from the axis of said hub.

3. A propeller rotatable about an axis and having a two-part hub, one part of said hub being fixed to a driving shaft and the other part of said hub carrying the blades of said propeller, said two hub parts being relatively rotatable and relatively movable axially, pitch changing mechanism connected with said blades and the blade carrying part of said hub for changing the pitch of said blades independent of the relative position of said hub parts, damping means, comprising a fluid pump with restricted outlets, connected with both of said hub parts and actuatable only by relative movements of said hub parts in an axial direction for damping the movements between the hub parts.

4. In a propeller having a hub including a portion fixed against axial movement relative to a propeller shaft, and a plurality of blades carried by said hub, a flexible connection between each blade and said hub portion including means resiliently resisting movement of the hub ends of said blades relative to said hub portion, means for changing the pitch of said blades independent of the relative position of said blade ends and said hub portion, a sump, and a fluid pump having one relatively movable part connected with said hub portion and another relatively movable part connected with the hub ends of said blades and having a valve-controlled fluid outlet and inlet connected with a sump whereby fluid will be taken from said sump, forced through the pump and returned to the sump by movements of the hub ends of said blades relative to said hub portion, said pump having a restricted fluid outlet passage for producing fluid friction to damp the movements of the hub ends of said blades relative to said hub portion.

5. In a propeller rotatable about an axis and having a hub and a plurality of blades carried by said hub, a flexible connection between each blade and said hub including means resiliently resisting movement of the hub ends of said blades relative to said hub in directions perpendicular to the major axis of each blade, and friction damping means carried by said hub and operatively connected with the hub ends of said blades, and actuated by relative movement of said hub and the hub ends of said blades in the direction of the axis of rotation of said propeller but unaffected by relative rotation of said hub and the hub ends of said blades for frictionally damping movements permitted by said resilient connections, said friction means comprising an expansible chamber device having one part connected with the hub ends of said blades and another part held against axial movement relative to the hub, said device having restricted fluid passages leading from the interior thereof.

6. An aeronautical propeller having a hub adapted to be mounted for rotation about an axis, a plurality of blades carried by said hub, a connection having a limited freedom of movement between each blade and one portion of said hub, said connection being resilient and flexible circumferentially of, and in opposite directions parallel to, said axis and including means resiliently resisting movement between the hub end of each blade and said hub portion circumferentially about said axis and parallel to said axis, and substantially inelastic friction damping means connected with the hub ends of said blades resisting and frictionally damping all movements in both directions parallel to said axis.

7. An aeronautical propeller as claimed in claim 6 in which said friction damping means comprises a pair of concentric, telescoped, cylindrical members arranged concentric with said axis and including friction means resisting relative axial movement of said members.

8. A propeller as claimed in claim 7 in which said pair of members are substantially freely rotatable relative to each other.

9. An aeronautical propeller having a hub adapted to be mounted for rotation about an axis, a plurality of blades carried by said hub, a connection having a limited freedom of movement between each blade and one portion of said hub, said connection being resilient and flexible circumferentially of, and in opposite directions parallel to, said axis and including means resiliently resisting movement between the hub end of each blade and said hub portion circumferentially about said axis and parallel to said axis, and friction damping means resisting and frictionally damping movement of the hub ends of said blades in both directions parallel to said axis, said friction damping means comprising a pair of concentric, telescoped, cylindrical members arranged concentric with said axis, means connecting one member of said pair with the hub ends of said blades to impart movement of said blade ends parallel to said axis to said one member, and means restraining the other member of said pair against such movement of said one member, and means frictionally resisting axial movement of said members relative to each other.

10. A propeller as claimed in claim 9 in which said pair of members are substantially freely rotatable relative to each other.

JOHN G. BAKER.

REFERENCES CITED

The following references are of record in the file of this patent:

UNITED STATES PATENTS

| Number | Name | Date |
|---|---|---|
| 431,387 | McHugh | July 1, 1890 |
| 1,134,224 | Phillips | Apr. 6, 1915 |
| 1,242,195 | Johanson | Oct. 9, 1917 |
| 1,458,814 | Focht | June 12, 1923 |
| 1,930,380 | Binks | Oct. 10, 1933 |
| 1,952,798 | Havill | Mar. 27, 1934 |
| 1,965,742 | Junkers | July 10, 1934 |
| 2,067,109 | Viale et al. | Jan. 5, 1937 |
| 2,112,797 | Tyler | Mar. 29, 1938 |
| 2,144,428 | Martin | Jan. 17, 1939 |
| 2,245,251 | Chilton | June 10, 1941 |

FOREIGN PATENTS

| Number | Country | Date |
|---|---|---|
| 48,916 | France | June 21, 1938 |
| | (Addition to No. 817,252) | |
| 289,344 | Italy | Oct. 13, 1941 |
| 332,646 | Great Britain | July 28, 1930 |
| 427,503 | France | Apr. 5, 1911 |
| 660,674 | France | Feb. 25, 1929 |